(12) United States Patent
Mukherjee et al.

(10) Patent No.: US 11,069,083 B2
(45) Date of Patent: Jul. 20, 2021

(54) METHOD AND A SYSTEM FOR COUNTING OBJECTS IN AN IMAGE

(71) Applicant: WIPRO LIMITED, Bangalore (IN)

(72) Inventors: Aniruddha Mukherjee, Kolkata (IN); Subhabrata Biswas, Kolkata (IN); Debasish Chanda, Maheshtala (IN)

(73) Assignee: Wipro Limited, Bangalore (IN)

( * ) Notice: Subject to any disclaimer, the term of this patent is extended or adjusted under 35 U.S.C. 154(b) by 162 days.

(21) Appl. No.: 16/190,187

(22) Filed: Nov. 14, 2018

(65) Prior Publication Data

US 2020/0051272 A1 Feb. 13, 2020

(30) Foreign Application Priority Data

Aug. 13, 2018 (IN) .............................. 201841030413

(51) Int. Cl.
*G06K 9/00* (2006.01)
*G06T 7/73* (2017.01)
*G06T 7/13* (2017.01)

(52) U.S. Cl.
CPC .................. *G06T 7/73* (2017.01); *G06T 7/13* (2017.01); *G06T 2207/20036* (2013.01)

(58) Field of Classification Search
None
See application file for complete search history.

(56) References Cited

U.S. PATENT DOCUMENTS

| 2016/0042251 | A1* | 2/2016 | Cordova-Diba | G06K 9/4604 382/180 |
| 2016/0110613 | A1* | 4/2016 | Ghanem | G06T 7/215 382/103 |
| 2016/0205282 | A1* | 7/2016 | Metcalfe | H04N 1/6027 358/448 |
| 2016/0224829 | A1* | 8/2016 | Chou | G06T 7/11 |
| 2016/0371634 | A1* | 12/2016 | Kumar | G06Q 10/087 |
| 2017/0053420 | A1* | 2/2017 | vanderZweep | G06K 9/6217 |

OTHER PUBLICATIONS

Aradhya, HV Ravish. "Elegant and efficient algorithms for real time object detection, counting and classification for video surveillance applications from single fixed camera." 2016 International Conference on Circuits, Controls, Communications and Computing (I4C). IEEE, 2016. (Year: 2016).*

* cited by examiner

*Primary Examiner* — Sean M Conner
(74) *Attorney, Agent, or Firm* — Finnegan, Henderson, Farabow, Garrett & Dunner, LLP

(57) ABSTRACT

A method and a system are described for counting objects in an image. The method includes receiving at least one image comprising one or more objects. The method includes determining contours of the one or more objects using one or more morphological operations on the at least one image. The method further includes identifying shapes of the one or more objects based on counting a number of contours associated with each of the one or more objects. The method includes comparing the shapes of the one or more objects with one or more predefined training images to identify one or more objects of interest. The method includes counting the one or more objects of interest based on the shapes of the one or more objects of interest.

13 Claims, 7 Drawing Sheets

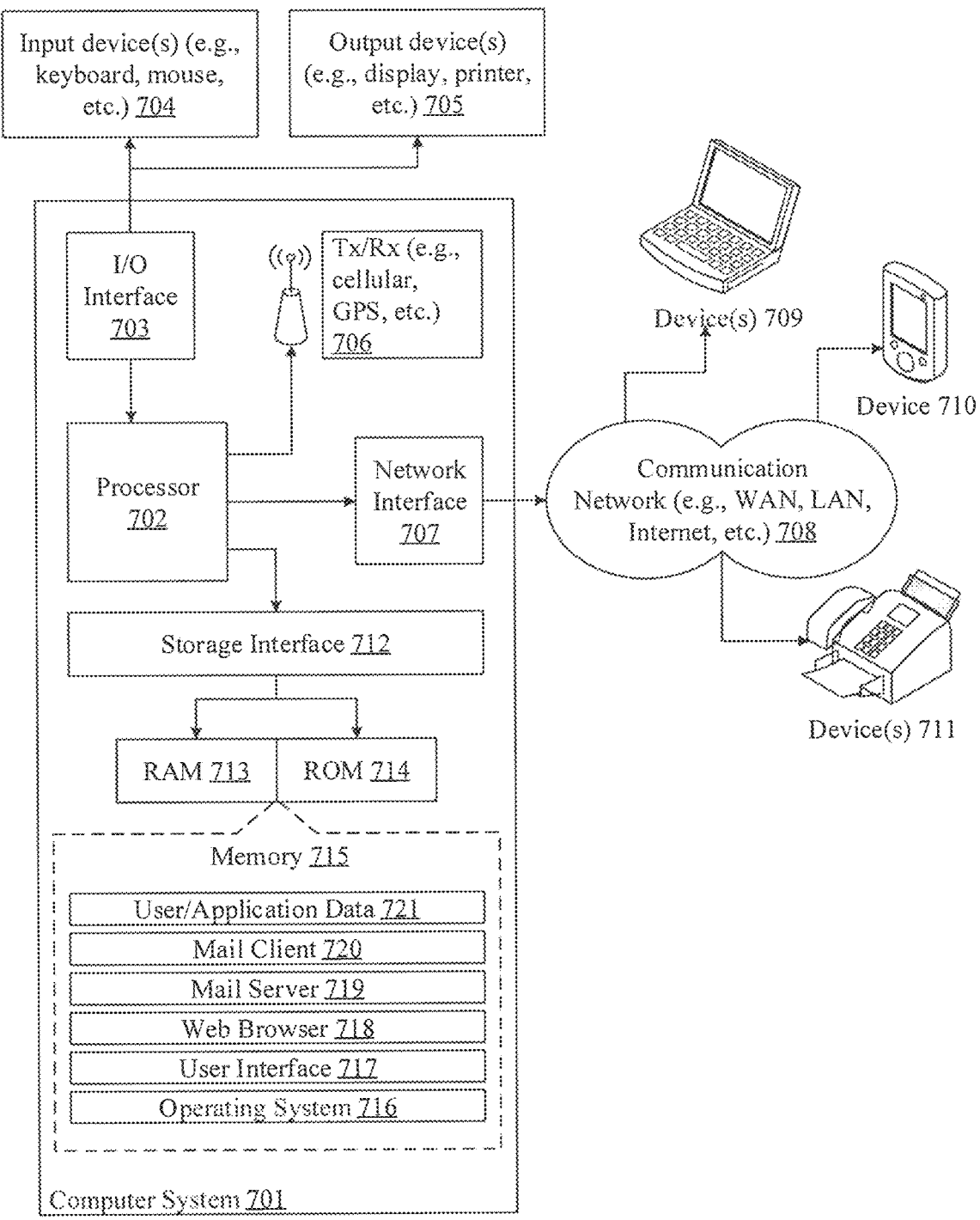
FIG. 7 Example Computer System

METHOD AND A SYSTEM FOR COUNTING OBJECTS IN AN IMAGE

TECHNICAL FIELD

The present subject matter is related, in general, to digital image processing and more specifically, but not exclusively, to a method and a system for counting objects of distinct shapes and sizes from an image.

BACKGROUND

Store inventory management is considered as an important and daily activity in many retail store operations and logistics businesses. As it can be understood, retail store operations and logistics business need to regularly keep a tab on its existing or depleting stock of goods. Hence, an accurate counting of stock of goods in three dimensional space in the store or the warehouse helps in better management. It helps in optimizing stock of goods and thus enables a user to keep note on requirement for timely product replenishment.

There can be situations where objects (interchangeably used as goods or stocks) can be a heterogeneous or homogeneous set of objects and looking at the voluminous amount of objects which forms a part of transaction in any retail operations, there is a need for accurate counting of objects. Retail stores currently adopt manual stock counting methods to count objects of varying shapes and sizes. Manual counting is a monotonous, time consuming, tedious and repetitive type of work. Further, manual counting may lead to errors in the count of objects due to voluminous amount of objects available in a warehouse. In another scenario the objects may be stacked on top of each other and this may add a further difficulty in counting. Conventional image processing technique fails for stacked objects as objects are flat in nature that makes it difficult to identify the edge to mark the contour. This problem gets further complicated due to distance from where the picture is taken, lighting condition, different shape and size of the objects, inclination of the objects, gaps between the objects and also the background may not be distinguishable.

SUMMARY

The foregoing summary is illustrative only and is not intended to be in any way limiting. In addition to the illustrative aspects, embodiments, and features described above, further aspects, embodiments, and features will become apparent by reference to the drawings and the following detailed description.

According to embodiments illustrated herein, there may be provided a method of counting objects in an image. The method may include receiving, by an image processing device, at least one image comprising one or more objects. Subsequently, the method may include determining contours of the one or more objects using one or more morphological operations on the at least one image. Thereafter, the method may include identifying shapes of the one or more objects based on counting a number of contours associated with each of the one or more objects. The method may further include comparing the shapes of the one or more objects with one or more predefined training images to identify one or more objects of interest. Subsequently, the method may include counting the one or more objects of interest based on the shapes of the one or more objects of interest.

According to embodiments illustrated herein, there may be provided an image processing device for counting objects in an image. The image processing device comprises a processor and a memory communicatively coupled to the processor, wherein the memory stores processor instructions, which, on execution, causes the processor to receive at least one image comprising one or more objects. The processor may be further configured to determine contours of the one or more objects using one or more morphological operations on the at least one image. The processor may be further configured to identify shapes of the one or more objects based on counting a number of contours associated with each of the one or more objects. The processor may be further configured to compare the shapes of the one or more objects with one or more predefined training images to identify one or more objects of interest. The processor may be further configured to count the one or more objects of interest based on the shapes of the one or more objects of interest.

According to embodiments illustrated herein, a non-transitory computer-readable storage medium having stored thereon, a set of computer-executable instructions for causing a computer comprising one or more processors to perform steps of receiving at least one image comprising one or more objects. The computer-readable storage medium may further include instructions to determine contours of the one or more objects using one or more morphological operations on the at least one image. The computer-readable storage medium may further include instructions to identify shapes of the one or more objects based on counting a number of contours associated with each of the one or more objects. The computer-readable storage medium may further include instructions to compare the shapes of the one or more objects with one or more predefined training images to identify one or more objects of interest. The computer-readable storage medium may further include instructions to count the one or more objects of interest based on the shapes of the one or more objects of interest.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

FIG. 7 illustrates a block diagram of an exemplary computer system for implementing embodiments consistent with the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

The present disclosure may be best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment," "one example," "an example," "for example," and so on indicate that the embodiment(s) or example(s) may include a particular feature, structure, characteristic, property, element, or limitation but that not every embodiment or example necessarily includes that particular feature, structure, characteristic, property, element, or limitation. Further, repeated use of the phrase "in an embodiment" does not necessarily refer to the same embodiment.

Figure 1:
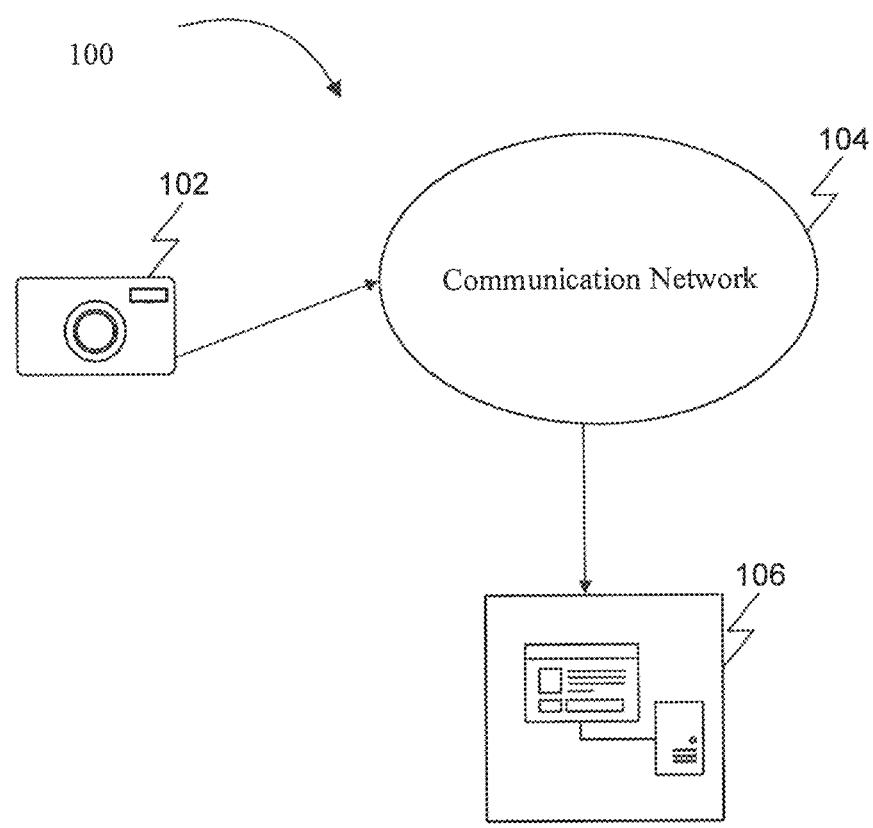
FIG. 1 illustrates a block diagram of an exemplary environment in which various embodiments of the present disclosure may function.

FIG. 1 is a block diagram that illustrates an exemplary environment 100 in which various embodiments of the present disclosure may function. The environment 100 may include an image capturing device such as a camera 102. In some embodiments, camera 102 may include a fixed positioned camera such as a close circuit camera. In some other embodiments, camera 102 may include a mobile device camera. Camera 102 may capture one or more images and may communicate through a communication network 104 with an image processing device 106. The communication network 104 although represented as one communication network in FIG. 1 may in reality correspond to different communication networks under different contexts. For example, the communication network 104 may include various wired and wireless communication protocols. Examples of such wired and wireless communication protocols include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, 2G, 3G, 4G cellular communication protocols, and/or Bluetooth (BT) communication protocols. The communication network 104 may include, but is not limited to, the Internet, a cloud network, a Wireless Fidelity (Wi-Fi) network, a Wireless Local Area Network (WLAN), a Local Area Network (LAN), a telephone line (POTS), and/or a Metropolitan Area Network (MAN).

In an embodiment, the image processing device 106 may refer to a computing device that may be configured to receive at least one image comprising one or more objects, pre-defined training images, one or more calibration parameters, minimum and maximum dimensions of objects of interest, and shapes of the object of interest. The image processing device 106 may include hardware and/or software that may be configured to perform one or more predetermined operations.

The image processing device 106 may refer to a computing device or a software framework hosting an application or a software service. The image processing device 106 may perform one or more operations through one or more units (explained in detail in FIG. 0.2). The one or more operations may include determining contours of the one or more objects using one or more morphological operations on the at least one image, identifying shapes of the one or more objects from the image, identifying objects of interest from the image, comparing the shapes of the one or more objects with the one or more predefined training images to identify one or more objects of interest, and counting the one or more objects of interest based on the shapes of the one or more objects of interest.

In an embodiment, the image processing device 106 may be implemented to execute procedures such as, but not limited to, programs, routines, or scripts stored in one or more memories for supporting the hosted application or the software service. In an embodiment, the hosted application or the software service may be configured to perform one or more predetermined operations. The image processing device 106 may be realized through various types of servers such as, but are not limited to, a Java application server, a .NET framework application server, a Base4 application server, a PHP framework application server, or any other application server framework.

Figure 2:
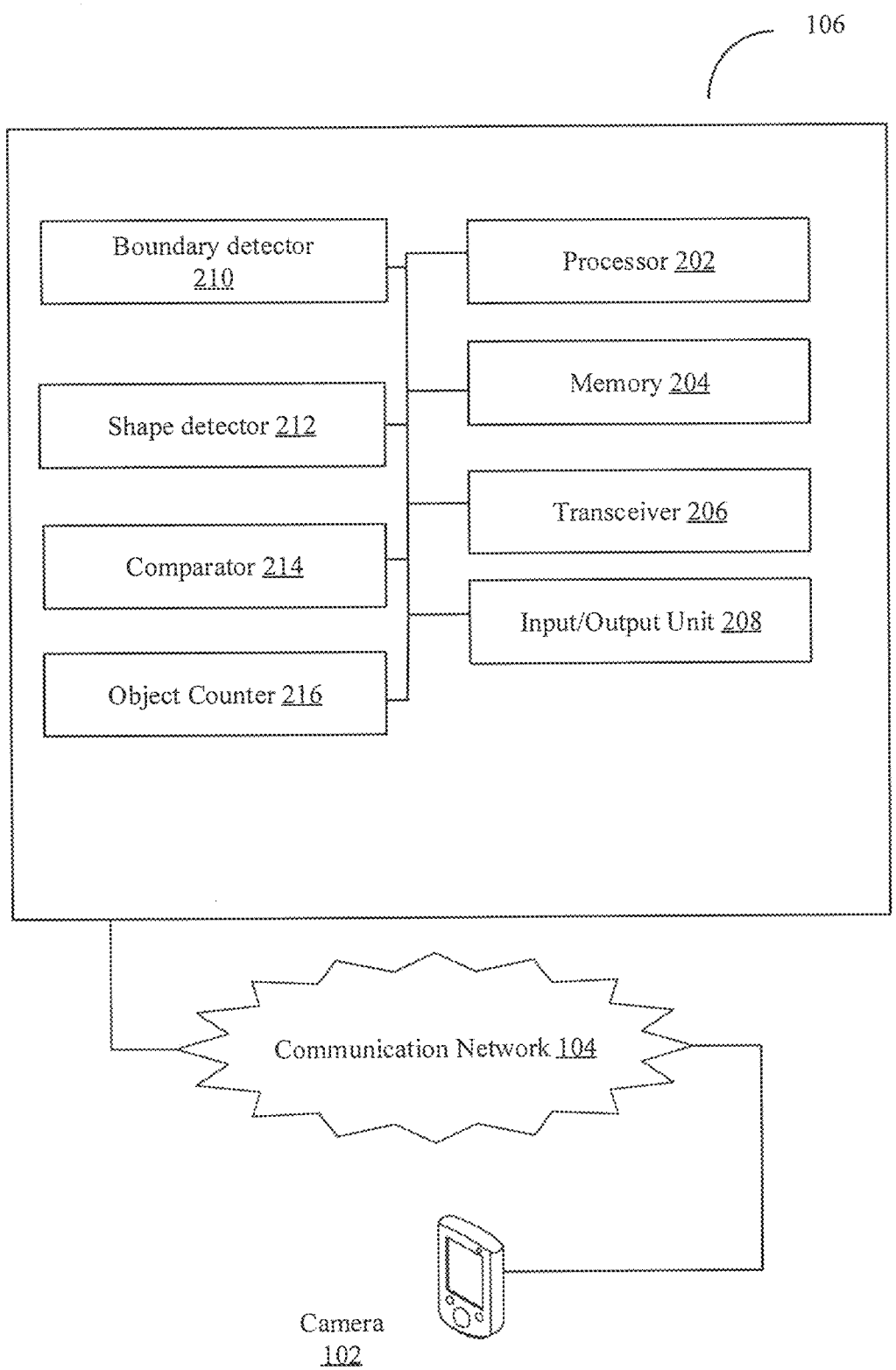
FIG. 2 illustrates a block diagram of an image processing device, in accordance with some embodiments of the present disclosure.

FIG. 2 is a block diagram that illustrates the image processing device 106 configured for counting objects of distinct shapes and sizes from an image, in accordance with some embodiments of the present disclosure. The image processing device 106 may include a processor 202, a memory 204, a transceiver 206, and an input/output unit 208. The image processing device 106 may further include a boundary detector 210, a shape detector 212, a comparator 214, and an object counter 216. The processor 202 may be communicatively coupled to the memory 204, the transceiver 206, the input/output unit 208, the boundary detector unit 210, the shape detector unit 212, the comparator 214, and the object counter unit 216.

The processor 202 may include suitable logic, circuitry, interfaces, and/or code that may be configured to execute a set of instructions stored in the memory 204. The processor 202 may be implemented based on a number of processor technologies known in the art. Examples of the processor 202 include, but not limited to, an X86-based processor, a Reduced Instruction Set Computing (RISC) processor, an Application-Specific Integrated Circuit (ASIC) processor, a Complex Instruction Set Computing (CISC) processor, and/or other processor.

The memory 204 may include suitable logic, circuitry, interfaces, and/or code that may be configured to store the set of instructions, which may be executed by the processor 202 for counting the one or more objects in the image. In an embodiment, the memory 204 may be configured to store one or more programs, routines, or scripts that may be executed in coordination with the processor 202. The memory 204 may be implemented based on a Random Access Memory (RAM), a Read-Only Memory (ROM), a Hard Disk Drive (HDD), a storage server, and/or a Secure Digital (SD) card.

The transceiver 206 may receive the at least one image comprising the one or more objects. In some embodiments, the transceiver 206 may receive a front view image and a top view image to count the one or more objects in 3 dimensional space. The user who may be located remotely may request the image processing device 106 to count the one or more images in the image. The image processing device 106 may receive, in addition to receiving this request, one or more images from the user over the communication network 104. The transceiver 206 may implement one or more known technologies to support wired or wireless communication with the communication network 104. In an embodiment, the transceiver 206 may include, but is not limited to, an antenna, a radio frequency (RF) transceiver, one or more amplifiers, a tuner, one or more oscillators, a digital signal processor, a Universal Serial Bus (USB) device, a coder-decoder (CODEC) chipset, a subscriber identity module (SIM) card, and/or a local buffer. The transceiver 206 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as: Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

Figure 3:
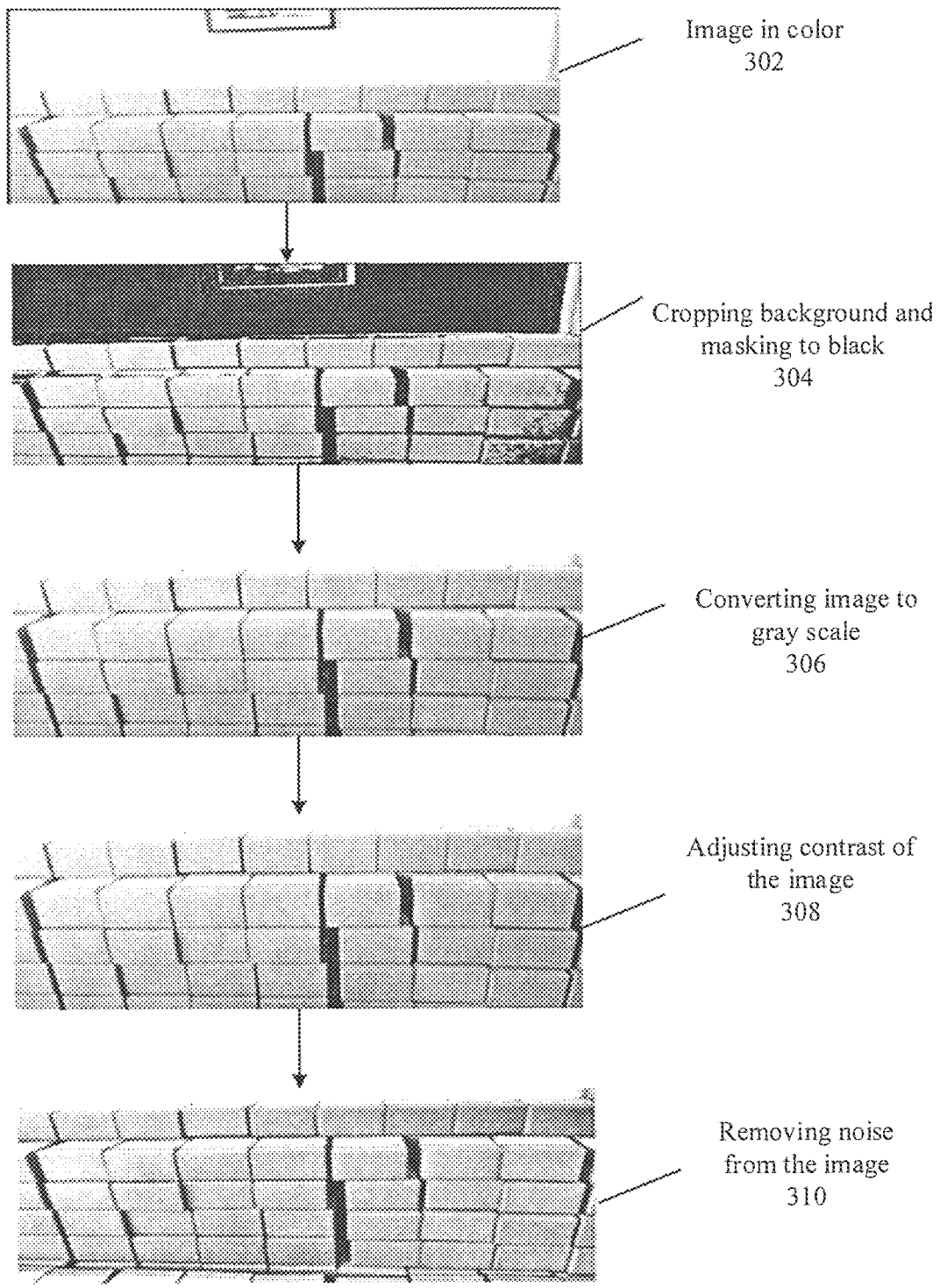
FIG. 3 is a flowchart illustrating a method for a pre-processing an image, in accordance with some embodiments of the present disclosure.

In some embodiments, the transceiver 206 may receive a pre-processed image from the image capturing device 102. Here, pre-processing the image may include performing operations of cropping an area of interest in the image by masking a background from the image, converting the cropped image to gray scale, adjusting the contrast of the image, and removing noise from the image. The pre-processing operations are illustrated in FIG. 3 where step 302 depicts the original RGB color image, step 304 depicts the original RGB color image where the foreground objects are retained in color and the background is masked by changing the background pixels to black pixels thereby cropping the objects of interest. In other words, only required color and texture are highlighted on the image and the other parts of the image are masked with black pixels. Thereafter, at step 306, the cropped image is converted to grayscale. Further pre-processing steps including adjusting contrast of the image and removing noise from the image may be performed by steps 308 and 310 respectively.

In some other embodiments, image processing device 106 may receive a raw RGB image from the image capturing device and thereafter the image processing device 106 may perform pre-processing of the raw image prior to determining the contours of the objects in the image. The pre-processing of the image is applied so as to accurately capture the contours of the one or more objects in the image. Determining the contours of the objects is determined in detail in conjunction with FIG. 4.

The following steps illustrates image pre-processing:

```
1. BEGIN
    Pick the pixel (pxl) value from Object of Interest Image
    For all pixel (pxl/ ) in image Do
    BEGIN
        If pxl/ is not in the range of pxl
            Mask pxl/ to black
    END
2. grayImg = Convert cropped RGB image to grayscale
3. filtImg = Remove noise from gray scale image (grayImg)
    using d, σColor and σSpace
4. Create Adaptive Histogram Equalizer using cliplimit and
    tilegridsize.
    pre_proc_img = Perform Adaptive Histogram
    Equalization on filtImg
    RETURN pre_proc_img
END
```

The above steps illustrate cropping an area of interest in the image by masking the background from the image. In the exemplary case the background in the image is eliminated by masking it with black color. The image processing device 106 is configured to identify the one or more objects in a pixel range. For example, the background is eliminated as it does not come under the pre-defined pixel range. In step 2, "grayimg" denotes conversion of the cropped image in color to gray scale. In step 3, "filtImg" denotes removing noise and distortions from the image, where 'd' denotes diameter of each pixel, 'σColor' denotes standard deviation in color space and denotes standard deviation in co-ordinate space. 'Cliplimit' and 'tilegridsize' denotes threshold for contrast and grid to be applied for histogram equalization respectively. The adaptive histogram equalization may be used to improve contrast of the image, keeping note of the threshold for contrast in the instant embodiment.

The image processing device 106 may further include an Input/Output (I/O) unit 208. The Input/Output (I/O) unit 208 may include suitable logic, circuitry, interfaces, and/or code that may be configured to receive an input or transmit an output. The input/output unit 208 may include various input and output devices that are configured to communicate with the processor 202. Examples of the input devices include, but are not limited to, a keyboard, a mouse, a joystick, a touch screen, a microphone, and/or a docking station. Examples of the output devices include, but are not limited to, a display screen and/or a speaker.

Figure 4:
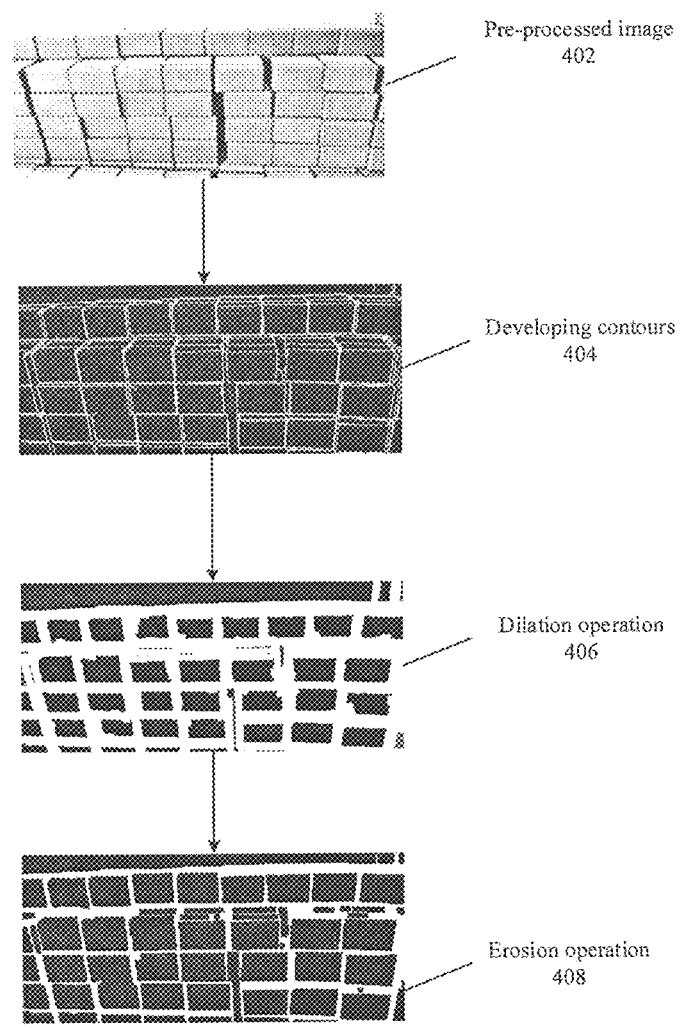
FIG. 4 is a flowchart illustrating a method of determining contours of objects in an image using morphological operations, in accordance with some embodiments of the present disclosure.

Once the transceiver 206 receives the image including the one or more objects, the boundary detector unit 210 may be configured to determine contours of the one or more objects using one or more morphological operations on the image. FIG. 4 illustrates an exemplary scenario wherein the contours of the one or more objects are determined using canny-edge detection and morphological operations. The process begins at step 402 where the pre-processed image is received by the boundary detector unit 210. At step 404, a canny-edge detection operation may be performed on the pre-processed image to detect a wide range of edges in the image. In other words, the canny-edge detection operation extracts useful structural information from different vision objects and identifies edges of objects within the pre-processed image. Thereafter, at step 406, a morphological operation such as dilation operation may be applied to the pre-processed image. A dilation to an image is done to enlarge the boundaries of foreground (white) pixels. The dilation step may be followed by an erosion operation at step 408. The erosion operation as depicted in step 408 removes pixels on object boundaries. The number of pixels added or removed from the objects in an image depends on the size and shape of the kernel used to process the image. In the morphological dilation and erosion operations, the state of any given pixel in the output image is determined by applying a rule to the corresponding pixel and its neighbors in the input image.

In an embodiment, the one of the erosion operation and the dilation operation includes using at least one kernel matrix, wherein the kernel matrix is configured by pre-setting a minimum threshold hysteresis value and a maximum threshold hysteresis value. For example, the kernel matrix acts like a filter. The kernel matrix filter may be configured in a shape of the one or more objects of interest. In other words, the kernel matrix filter may be configured in one of more shapes of objects that are to be detected by the image processing device 106 from the one or more images. The filter when applied takes the shape of the one or more objects of interest and the kernel matrix filter is configured to learn the contours of the one or more objects of interest. The one or more pixels falling within the contours are elaborated or dilated and the one or more pixels falling outside the contours of the objects of interest are eliminated or eroded. In some embodiments, boundary detector unit 210 may determine an approximate polygon from the one or more images using Dougls-Peucker approximation technique.

Once the contours of the one or more objects using the one or more morphological operations are determined, the shape detector 212 identifies shapes of the one or more objects based on counting a number of contours associated with each of the one or more objects. The shape detector 212 receives the data on number of contours of an object and counts the number of contours associated with an object with respect to the pre-defined number of contours, corresponding to various shapes.

TABLE 1

| Number of Contour | Shape |
|---|---|
| 5 | Pentagon |
| 3 | Triangle |
| 4 | Rectangle |
| 9 | Half circle |
| >15 | Circle |

Table 1 illustrates number of contours and its corresponding shapes. The shape detector 212 determines the shape of the one or more objects by checking the number of contours with number of contours of known shapes. For example, if the number of contours is determined to be three, the shape of the object is a triangle. Similarly, if the shape detector unit 212 determines a count of four for an object and that all the four contours are of equal dimensions, it shall determine the object to be a square. The step of shape detection is to detect the shapes of different objects in a stacked or non-stacked environment of objects. However, whether the shape detected of different objects corresponds to the objects of interest is determined by the comparator 214.

The comparator 214 may then compare the shapes of the one or more objects with one or more predefined training images to identify one or more objects of interest. The image processing device 106 is thus trained with the one or more pre-defined training images, which may enable the comparator 214 to compare the shapes of the one or more objects with one or more predefined training images. For example, the predefined training images may at least be a square, a rectangle, a triangle, a semi-circle, a circle, a pentagon or a regular polygon which has more than five edges. In an exemplary embodiment, the image processing device 106 may be trained with identifying square shaped objects and even if the shape detector 212 can identify one or more objects of different shapes in a heterogeneous environment, the image processing device 106 in this example may only determine square shaped objects as objects of interest. The comparator 214 may be pre-trained with the images as mentioned. From these predefined training images, the comparator 214 may be configured to identify the object of interest. The comparator 214 may be further configured to determine the minimum and maximum dimensions of the one or more objects in the image based on the predefined training images. For example, the minimum and maximum dimensions of the one or more objects may be 20*10*10 (in centimeters) and 30*10*10 (in centimeters) respectively. Any object falling within this range of dimensions will be noted by the comparator 214. In an embodiment, the comparator 214 may be configured to determine a distance at which the objects of interest, which were identified from the image comprising one or more objects, are present from the image capturing device 102. For example, the minimum and maximum acceptable distance of the image from the image capturing device 104 may be between 10 meters and 15 meters and if the object is found beyond this range, it may not be counted for processing.

In another embodiment, the one or more objects may suffer aberrations due to physical damage which may cause a deformity in the shape. For example, an object of square shape may suffer a deformity on one of its edges. However, the comparator 214 may be configured to a threshold level for ignoring such deformities. For example, if the object of interest is a square box with a dimension tallying with the user requirement, it may be considered for counting even though it might have suffered a deformity and is unable to qualify as a perfectly square shaped object. The image processing device 106 may use machine learning techniques to encounter such situations which may occur at a later point of time. It may learn that the object of a particular shape, but with a deformity may also be counted for comparison.

Table 2 illustrates the one or more calibration parameters to configure the one or more training images. The one or more training images enables the comparator 214 to identify the one or more objects of interest.

TABLE 2

| Function name | Parameter name | Parameter explanation | Used parameter range | | | Recommended value |
|---|---|---|---|---|---|---|
| | | | Min | Max | Step | |
| Edge Detection | minVal | Minimum threshold for the hysteresis procedure, used for edge linking. | 0.1 | 100 | 0.1 | 1.3 |

TABLE 2-continued

| Function name | Parameter name | Parameter explanation | Used parameter range Min | Used parameter range Max | Used parameter range Step | Recommended value |
|---|---|---|---|---|---|---|
| | maxVal | Maximum threshold for the hysteresis procedure, used to find initial segments of strong edges. | 0.1 | 200 | 0.1 | 200 |
| Noise Removal | D | The diameter of each pixel neighborhood. | 1 | 20 | 1 | 11 |
| | σColor | Standard deviation in the color space. | 1 | 20 | 1 | 7 |
| | σSpace | Standard deviation in the coordinate space. | 1 | 20 | 1 | 7 |
| Erosion/ Dilation Processing | Kd | (n × n) kernel matrix applied for erosion/dilation. | 1 | 20 | 1 | 17 |
| Contrast Adjustment | clipLimit | Threshold for contrast limiting. | 0.1 | 100 | 0.1 | 2 |
| | tileSize | (n ×n) grid applied for histogram equalization. | 5 | 10 | 1 | 5 |
| Number of cluster | K | Number of possible dimension of the object | 1 | 10 | 1 | 3 |

As illustrated in Table 2 the predefined training images are based on the one or more calibration parameters and may include at least, number of possible dimensions of the one or more objects, threshold for contrast limiting of the image, possible numbers of kernel matrices, diameter of a pixel, minimum threshold for hysteresis procedure for edge detection and maximum threshold for hysteresis procedure, minimum and maximum dimensions of training objects, shape of the training objects, number of possible dimensions of the training objects, and distance of the training objects. The following steps illustrate identifying different possible dimensions of the one or more objects.

Step 1:
Identify different possible dimensions of the object as follows. The possible dimensions of the one or more objects:

$S = \{w_1 * h_1, \ldots, w_n * h_n\}$ where $n$ is total possible dimension of the object Step 2:
Apply K-Means Clustering method to group above possible dimensions in set S to k-cluster as follows:

$S_i' = \{w_1' * h_1', \ldots, w_k' * h_k'\}$ where $k$ is total possible cluster Step 3:
Follow Step 1 and Step 2 for all training set. Get all possible dimensions across training set as follows:

$S_i' = \{w_{1i}' h_{1i}', \ldots, w_{ki}' * h_{ki}'\}$ where $S_i'$ represents K-cluster on $i^{th}$ Then $L = \{S_1', \ldots, S_1'^m\}$ where $m$ is the total number of training set Step 4:
Apply K-Means Clustering method to group above possible dimensions in set L to k-cluster as follows $L' = \{w_{i1}' * h_{I1}', \ldots, w_{Ik}' * h_{Ik}'\}$ Step 5: While validating the contour L' will be considered
In another embodiment the image processing device may encounter a situation where it may have to identify shapes of objects which do not tally with the predefined training images based on which the image processing device 106 has been trained with. In such a scenario the image processing device 106 may flag such a polygon as "Polygon 1". The image processing device 106 may in future apply cognitive capability to identify the object which has same characteristics as of "Polygon 1".

Once the comparator 214 compares the shape of the one or more objects of interest, the object counter 216 counts the one or more objects of interest based on the shapes of the one or more objects of interest. In an embodiment, the object counter 216 may be configured to count one or more homogenous or heterogeneous set of objects. In another embodiment, the object counter 216 may be configured to count one or more stacked objects or one or more objects spatially distributed on a planar surface. The object counter 216 is further configured to be connected to a stock alert system (not shown in Figures). The stock alert system alerts the user when a number of the one or more objects of interest is below a threshold number. The following method illustrates a method of counting the one or more objects of interest based on the shapes of the one or more objects of interest.

```
BEGIN
    count = 0
    Detect All contours using Develop Contour algorithm.
        is above threshold dimension,maxDimWidth and
        maxDimHeight
        If width and height of contour matches with width and
        length of one of the elements present in L' (L' represents
        allowable dimensions derived from training set)
        as computed by Calibration System
            count=count+1
        END
    Depending on the contour co-ordinates compute row and column
    Return count, row, column
END
```

Drawing reference from Table 1, the one or more objects are counted if the number of the contours of the one or more objects matches match with the number of contours of the one or more object of interest. Once the one or more objects of interest is ascertained, the counter which was initially set to zero is increased by one and the iterations continue till the one or more objects of interest are identified.

In an embodiment, the object counter system 216 may count the one or more objects of interest which may be stacked on top of each other or the one or more objects of interest may be spatially distributed on the planar surface. For example, one or more cameras can be used to count the one or more stacked objects of interest. A camera can be placed on top of the one or more stacked objects of interest, to capture a top view image and a second camera can be placed to the face the one or more stacked objects of interest, to capture a side view image. Once the one or more images are captured, processed and then contours drawn, the object counter system 216 may count the one or more objects of interest. The top view image and the side view image may be used to determine corresponding rows and columns from both top view and side views. The object counter 216 may then multiply the corresponding rows with the columns.

For example, if the front view has X rows and Y columns and top view has Y rows and Z columns, count will be computed as follows:

$$\text{count} = X \ast Y \ast Z$$

The object counter 216 may then flag for the number of the one or more objects of interest in the store inventory of the corresponding count falls below a certain threshold for the user to be notified.

Figure 5A:
FIG. 5A and FIG. 5B illustrates contours of stacked and un-stacked objects determined by the image processing device.
Figure 5B:
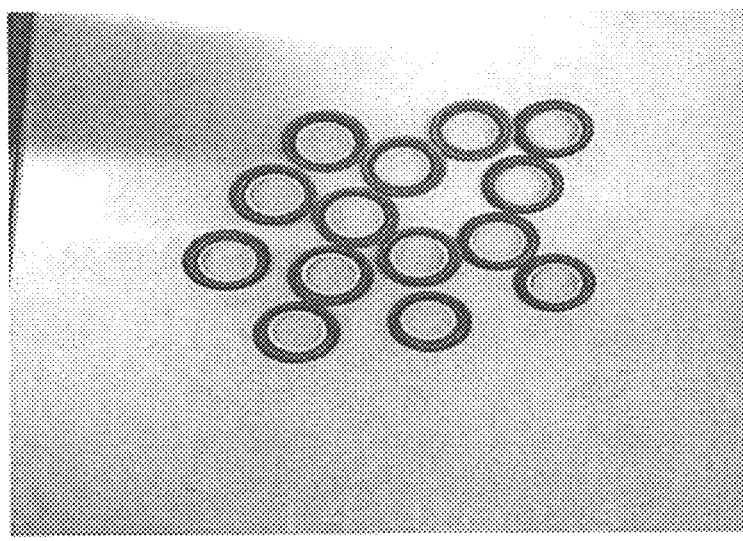

FIG. 5A and FIG. 5B illustrates one or more objects stacked on top of each other and the one or more objects distributed on a planar surface, respectively. After the object counter 216 has counted the one or more objects of interest based on the shapes, the outcome may be what is shown in FIG. 5A, for stacked objects and FIG. 5B for the one or more objects distributed on a planar surface, where the contours are drawn over the one or more objects of interest.

Figure 6:
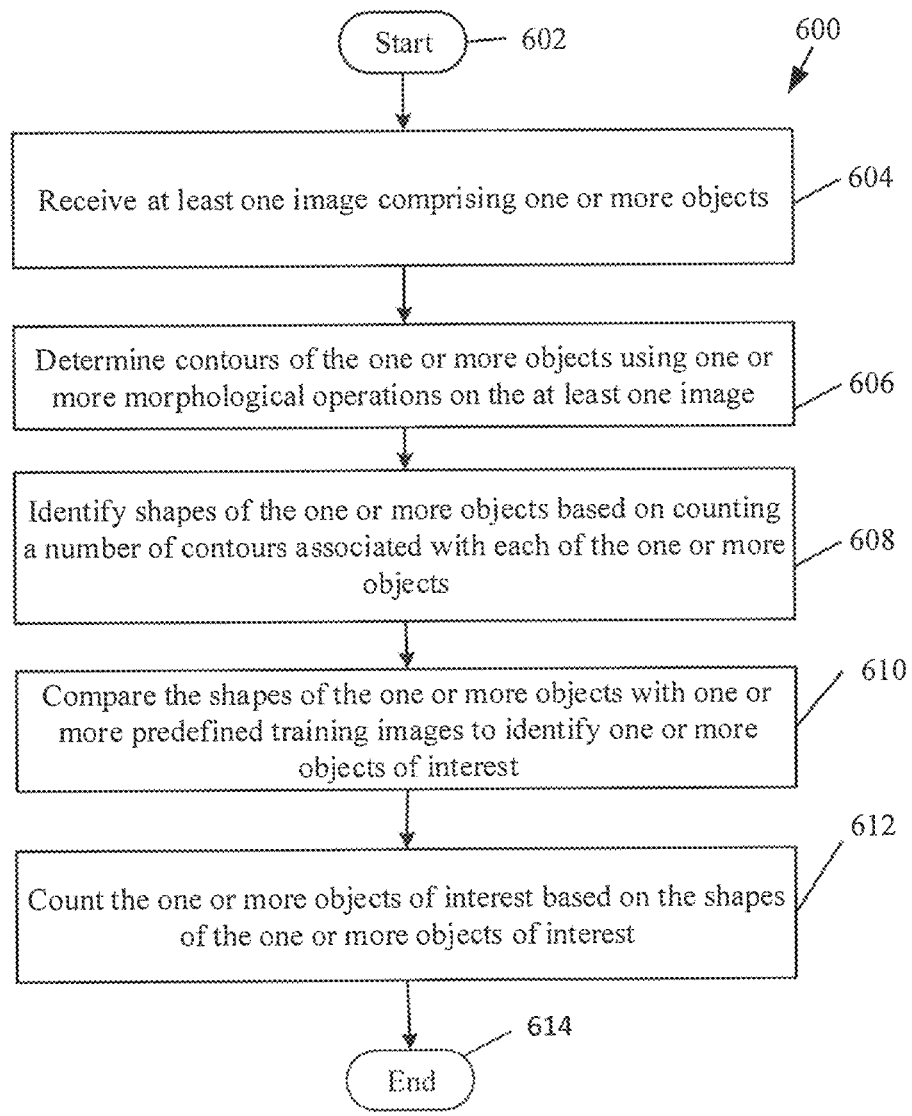
FIG. 6 is a flowchart illustrating a method of counting objects in an image in accordance with some embodiments of the present disclosure.

FIG. 6 illustrates a method flow for counting objects in an image. The method starts at step 602 and ends at 614. At step 604 the image processing device 106 may be configured to receive at least one image comprising one or more objects. The one or more objects in the image may be a heterogeneous or homogeneous set of objects. The one or more objects may be stacked on top of each other or may be distributed on a planar surface. The at least one image may be captured by one or more image capturing device, either fixed or hand held. In an embodiment, in case of one or more stacked objects, the image capturing device may capture a side view image and a top view image. Once the at least one image is received, at step 606 the image processing device 106 may be configured to determine contours of the one or more objects using one or more morphological operations on the at least one image. Prior to determining the contours, the at least one image may be subject to pre-processing to enhance the quality of the image. Pre-processing the at least one image may include cropping an area of interest in each of the at least one image by masking a background in each of the at least one image. After eliminating the background by masking, the image is converted into grayscale. Once the image is converted to gray scale, it is further pre-processed to remove noise and adjust contrast of the gray scale image. Once the image is pre-processed, the image processing device 106 determines contours of the one or more objects using one or more morphological operations on the at least one image. The contours of the one or more objects are determined using canny-edge detection operation. The contours once determined may be subjected to one or morphological processing. The one or more morphological processing may include at least one of an erosion operation and a dilation operation. Once the contours are determined, at step 608 the image processing device 106 may be configured to identify shapes of the one or more objects based on counting a number of contours associated with each of the one or more objects. The shapes of the one or more objects may be at least a square, rectangle, triangle, pentagon, semi-circle or a circle. At step 610 the image processing device 106 may be configured to compare the shapes of the one or more objects with one or more predefined training images to identify one or more objects of interest. The image processing device 106 may be pre-trained with the images as mentioned. From these predefined training images, the comparator 214 may be configured to identify the object of interest. At step 612 the image processing device 106 may be configured to count the one or more objects of interest based on the shapes of the one or more objects of interest. In an embodiment, the one or more objects may be a heterogeneous set of objects. The image processing device 106 may increase the counter every time the object of interest may be determined. In another embodiment, the one or more homogeneous objects of interest may be stacked in rows and columns. The image capturing device in the embodiment may capture a side view image and a top view image to determine the number of rows and columns. Once the rows and columns are ascertained, they are multiplied to count the one or more homogeneous objects stacked on top of each other. Control then passes to step 614.

Computer System

FIG. 7 illustrates a block diagram of an exemplary computer system for implementing embodiments consistent with the present disclosure. Variations of computer system 401 may be used for counting objects in an image. The computer system 701 may comprise a central processing unit ("CPU" or "processor") 702. Processor 702 may comprise at least one data processor for executing program components for executing user or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon™, Duron or Opteron, ARM's application, embedded or secure processors, IBM PowerPC®, Intel's Core, Itanium, Xeon, Celeron or other line of processors, etc. The processor 402 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 802 may be disposed in communication with one or more input/output (I/O) devices via I/O interface 703. The I/O interface 703 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 703, the computer system 701 may communicate with one or more I/O devices. For example, the input device 704 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 705 may be a printer, fax machine, video display (e.g., cathode ray tube (CRT), liquid crystal display (LCD), light-emitting diode (LED), plasma, or the like), audio speaker, etc. In some embodiments, a transceiver 706 may be disposed in connection with the processor 702. The transceiver may facilitate various types of wireless transmission or reception. For example, the transceiver may include an antenna operatively connected to a transceiver chip (e.g., Texas Instruments WiLink WL1283, Broadcom BCM47501UB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 702 may be disposed in communication with a communication network 708 via a network interface 707. The network interface 707 may communicate with the communication network 708. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 708 may include, without limitation, a direct interconnection, local area network (LAN), wide area network (WAN), wireless network (e.g., using Wireless Application Protocol), the Internet, etc. Using the network interface 707 and the communication network 708, the computer system 701 may communicate with devices 710, 711, and 712. These devices may include, without limitation, personal computer(s), server(s), fax machines, printers, scanners, various mobile devices such as cellular telephones, smartphones (e.g., Apple iPhone™, Smart TV, Android-based phones, etc.), tablet computers, eBook readers (Amazon Kindle, Nook, etc.), laptop computers, notebooks, gaming consoles (Microsoft Xbox™, Nintendo DS™, Sony PlayStation™, etc.), or the like. In some embodiments, the computer system 701 may itself embody one or more of these devices.

In some embodiments, the processor 702 may be disposed in communication with one or more memory devices (e.g., RAM 413, ROM 414, etc.) via a storage interface 712. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 716, user interface application 717, web browser 718, mail server 719, mail client 720, user/application data 721 (e.g., any data variables or data records discussed in this disclosure), etc. The operating system 716 may facilitate resource management and operation of the computer system 701. Examples of operating systems include, without limitation, Apple Macintosh OS X, UNIX, Unix-like system distributions (e.g., Berkeley Software Distribution™ (BSD), FreeBSD, NetBSD, OpenBSD, etc.), Linux distributions (e.g., Red Hat™, Ubuntu™, Kubuntu™, etc.), IBM OS/2™, Microsoft Windows™ (XP, Vista/7/8, etc.), Apple iOS®, Google Android™, or the like. User interface 717 may facilitate display, execution, interaction, manipulation, or operation of program components through textual or graphical facilities. For example, user interfaces may provide computer interaction interface elements on a display system operatively connected to the computer system 701, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero™, Metro™, etc.), Unix X-Windows, web interface libraries (e.g., ActiveX™, Java™, Javascript™, AJAX™, HTML, Adobe Flash™, etc.), or the like.

In some embodiments, the computer system 401 may implement a web browser 718 stored program component. The web browser may be a hypertext viewing application, such as Microsoft™ Internet Explorer™, Google Chrome™, Mozilla Firefox™, Apple Safari™, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 701 may implement a mail server 719 stored program component. The mail server may be an Internet mail server such as Microsoft Exchange™, or the like. The mail server may utilize facilities such as ASP, ActiveX, ANSI C++/C#, Microsoft .NET™, CGI scripts, Java™, JavaScript™, PERL™, PHP™, Python™, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 701 may implement a mail client 720 stored program component. The mail client may be a mail viewing application, such as Apple Mail™, Microsoft Entourage™, Microsoft Outlook™, Mozilla Thunderbird™, etc.

In some embodiments, computer system 701 may store user/application data 721, such as the data, variables, records, etc. as described in this disclosure. Such databases may be implemented as fault-tolerant, relational, scalable, secure databases such as Oracle™ or Sybase™. Alternatively, such databases may be implemented using standardized data structures, such as an array, hash, linked list, struct, structured text file (e.g., XML), table, or as object-oriented databases. Such databases may be consolidated or distributed, sometimes among the various computer systems discussed above in this disclosure. It is to be understood that the structure and operation of the any computer or database component may be combined, consolidated, or distributed in any working combination.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise. The terms "including", "comprising", "having" and variations thereof mean "including but not limited to", unless expressly specified otherwise. The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

A person with ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like. The claims can encompass embodiments for hardware and software, or a combination thereof.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

Advantages of this Invention

The invention addresses the requirement of counting a large number of homogeneous and heterogeneous objects stacked on top of each other or unevenly distributed on a planar surface. Human eyes are incapable of counting large number of objects, stacked very close to each other. This solution improvises the computer vision technique to address this issue.

We claim:

1. A method of counting stocked objects in an image, the method comprising:
   receiving, by an image processing device, at least one image comprising one or more objects;
   determining, by the image processing device, contours of the one or more objects using one or more morphological operations on the at least one image;
   identifying, by the image processing device, shapes of the one or more objects based on counting a number of the determined contours associated with each of the one or more objects;
   comparing, by the image processing device, the shapes of the one or more objects with one or more predefined training images to identify one or more objects of interest, wherein the comparing further comprises determining minimum dimensions and maximum dimensions of the one or more objects of interest based on the one or more predefined training images, wherein the one or more predefined training images are based on one or more calibration parameters comprising the minimum dimensions and maximum dimensions of the one or more objects of interest, number of possible dimensions of the one or more objects of interest and shapes of the one or more objects of interest; and
   counting, by the image processing device, the stocked objects as the one or more objects of interest identified in the at least one image based on the shapes of the one or more objects of interest, the minimum dimensions and maximum dimensions of the one or more objects of interest, and a comparison of a distance of each of the one or more objects of interest from each of at least one image capturing device with a predefined maximum distance and a predefined minimum distance,
   wherein the one or more morphological operations comprise at least one of an erosion operation and a dilation operation, wherein the at least one of the erosion operation and the dilation operation comprises using at least one kernel matrix, wherein the kernel matrix is configured by pre-setting a minimum threshold hysteresis value and a maximum threshold hysteresis value, and wherein the kernel matrix is configured in a shape of the one or more objects of interest to determine the contour of the one or more objects in the at least one image.

2. The method of claim 1, wherein the one or more objects comprise a heterogeneous set of objects.

3. The method of claim 1, further comprising determining the contours of the one or more objects using canny-edge detection operation.

4. The method of claim 1 further comprising pre-processing the at least one image prior to determining the contours of the one or more objects.

5. The method of claim 4, wherein pre-processing the at least one image comprises: cropping an area of interest in each of the at least one image by masking a background in each of the at least one image; converting the at least one image to gray scale; removing noise from the at least one image; and adjusting contrast of the at least one image.

6. The method of claim 1, further comprising identifying the shapes of the one or more objects of interest, upon mismatching of the shapes of the one or more objects with the one or more predefined training images, by using machine learning techniques for determining characteristics of a polygon.

7. The method of claim 1, further comprising alerting a user when a number of the one or more objects of interest falls below a threshold level.

8. An image processing device for counting stocked objects in an image, the image processing device comprising:
   a processor; and
   a memory communicatively coupled to the processor, wherein the memory stores processor executable instructions, which on execution causes the processor to:
      receive at least one image comprising one or more objects;
      determine contours of the one or more objects using one or more morphological operations on the at least one image;
      identify shapes of the one or more objects based on counting a number of the determined contours associated with each of the one or more objects;
      compare the shapes of the one or more objects with one or more predefined training images to identify one or more objects of interest, wherein the comparing further comprises determining minimum dimensions and maximum dimensions of the one or more objects of interest based on the one or more predefined training images, wherein the one or more predefined training images are based on one or more calibration parameters comprising the minimum and maximum dimensions of the one or more objects of interest, number of possible dimensions of the one or more objects of interest and shapes of the one or more objects of interest; and
      count the stocked objects as the one or more objects of interest identified in the at least one image based on the shapes of the one or more objects of interest, the minimum dimensions and maximum dimensions of the one or more objects of interest, and a comparison of a distance of each of the one or more objects of interest from each of at least one image capturing device with a predefined maximum distance and a predefined minimum distance,
      wherein the one or more morphological operations comprise at least one of an erosion operation and a dilation operation, wherein the at least one of the erosion operation and the dilation operation comprises using at least one kernel matrix, wherein the kernel matrix is configured by pre-setting a minimum threshold hysteresis value and a maximum threshold hysteresis value, wherein the kernel matrix is configured in a shape of the one or more objects of interest to determine the contour of the one or more objects in the at least one image.

9. The image processing device of claim 8, wherein the one or more objects comprises a heterogeneous set of objects.

10. The image processing device of claim 8, wherein the processor is further configured to determine the contours of the one or more objects using canny-edge detection operation.

11. The image processing device of claim 8 wherein the processor is further configured to pre-process the at least one image prior to determine the contours of the one or more objects.

12. The image processing device of claim 11, wherein pre-processing the at least one image comprises: cropping an area of interest in each of the at least one image by masking a background in each of the at least one image; converting the at least one image to gray scale; removing noise from the at least one image; and adjusting contrast of the at least one image.

13. A non-transitory computer-readable storage medium having stored thereon, a set of computer-executable instructions causing a computer comprising one or more processors to perform steps comprising:
   receiving at least one image comprising one or more objects;
   determining contours of the one or more objects using one or more morphological operations on the at least one image;
   identifying shapes of the one or more objects based on counting a number of the determined contours associated with each of the one or more objects;
   comparing the shapes of the one or more objects with one or more predefined training images to identify one or more objects of interest, wherein the comparing further comprises determining minimum dimensions and maximum dimensions of the one or more objects of interest based on the one or more predefined training images, wherein the one or more predefined training images are based on one or more calibration parameters comprising the minimum and maximum dimensions of the one or more objects of interest, number of possible dimensions of the one or more objects of interest and shapes of the one or more objects of interest; and
   counting the stocked objects as the one or more objects of interest identified in the at least one image based on the shapes of the one or more objects of interest, the minimum dimensions and maximums dimensions of the one or more objects of interest, and a comparison of a distance of each of the one or more objects of interest from each of at least one image capturing device with a predefined maximum distance and a predefined minimum distance,
   wherein the one or more morphological operations comprise at least one of an erosion operation and a dilation operation, wherein the at least one of the erosion operation and the dilation operation comprises using at least one kernel matrix, wherein the kernel matrix is configured by pre-setting a minimum threshold hysteresis value and a maximum threshold hysteresis value, and wherein the kernel matrix is configured in a shape of the one or more objects of interest to determine the contour of the one or more objects on the at least one image.

* * * * *